(12) United States Patent
Bourlart

(10) Patent No.: US 8,991,437 B2
(45) Date of Patent: Mar. 31, 2015

(54) COMPOSITE PROTECTIVE ELEMENT FOR A THERMALLY INSULATED PIPE

(71) Applicant: Remi Bourlart, Bellignies (FR)

(72) Inventor: Remi Bourlart, Bellignies (FR)

(73) Assignee: Daher Aerospace, St. Julien de Chedon (FR)

( * ) Notice: Subject to any disclaimer, the term of this patent is extended or adjusted under 35 U.S.C. 154(b) by 0 days.

(21) Appl. No.: 13/898,884

(22) Filed: May 21, 2013

(65) Prior Publication Data

US 2013/0248039 A1    Sep. 26, 2013

Related U.S. Application Data

(63) Continuation-in-part of application No. 12/659,583, filed on Mar. 12, 2010, now abandoned.

(30) Foreign Application Priority Data

Mar. 17, 2009   (FR) ...................... 09 51675

(51) Int. Cl.
| F16L 59/10 | (2006.01) |
| F16L 59/135 | (2006.01) |
| F16L 59/11 | (2006.01) |

(52) U.S. Cl.
CPC ............... *F16L 59/10* (2013.01); *F16L 59/135* (2013.01); *F16L 59/11* (2013.01); *F16L 2201/30* (2013.01)
USPC ........... 138/104; 138/110; 138/149; 138/162; 138/163; 138/165; 138/167; 138/169; 138/170

(58) Field of Classification Search
USPC ......... 138/104, 110, 107, 149, 162, 163, 165, 138/167, 169, 170
See application file for complete search history.

(56) References Cited

U.S. PATENT DOCUMENTS

| 926,423 | A | | 6/1909 | Kelly |
| 1,814,134 | A | | 7/1931 | Abraham |
| 3,724,491 | A | | 4/1973 | Knudsen et al. |
| 4,207,918 | A | | 6/1980 | Burns et al. |
| 4,259,981 | A | | 4/1981 | Busse |
| 4,515,397 | A | | 5/1985 | Nowobilski et al. |
| 4,534,662 | A | | 8/1985 | Barlian |
| 4,624,893 | A | * | 11/1986 | Shibano et al. ............... 428/327 |
| 4,673,652 | A | | 6/1987 | McStravick et al. |
| 4,684,417 | A | | 8/1987 | Grandclement |
| 4,744,137 | A | | 5/1988 | Palazzo |
| 4,965,320 | A | * | 10/1990 | Overbergh .................... 525/207 |
| 5,634,497 | A | | 6/1997 | Neto |
| 5,875,821 | A | * | 3/1999 | Dumser et al. ................ 138/162 |
| 6,498,991 | B1 | | 12/2002 | Phelan et al. |
| 6,539,981 | B1 | | 4/2003 | Kleven et al. |
| 7,223,455 | B2 | * | 5/2007 | Ruid et al. ................. 428/36.91 |
| 7,947,354 | B2 | | 5/2011 | Pirogovsky et al. |
| 2003/0213525 | A1 | * | 11/2003 | Patel et al. .................... 138/149 |

FOREIGN PATENT DOCUMENTS

| DE | 103 02 001 | 7/2004 |
| EP | 0060552 | 9/1982 |

(Continued)

*Primary Examiner* — James Hook
(74) *Attorney, Agent, or Firm* — Jacobson Holman, PLLC

(57) ABSTRACT

A thermally insulating protection element for piping, including a hollow body with an open concavity and having a wall. The wall includes at least one rigid positioning and/or support platform designed to accommodate the fastening of technical equipment to be associated with the protection element. The element is designed to not only insulate piping, but also to constitute a direct device for supporting and fastening technical equipment such as a sensing line.

9 Claims, 2 Drawing Sheets

(56) References Cited

FOREIGN PATENT DOCUMENTS

| EP | 0 240 620 | 10/1987 |
| EP | 1 602 910 | 12/2005 |
| WO | 2007/004870 | 1/2007 |
| WO | 2008/019790 | 2/2008 |

* cited by examiner

COMPOSITE PROTECTIVE ELEMENT FOR A THERMALLY INSULATED PIPE

This application is a continuation in part of co-pending U.S. application Ser. No. 12/659,583 which is incorporated herein in its entirety by reference.

FIELD OF THE INVENTION

The invention relates to a protection element for the thermal insulation of piping, the element being also designed to act as a supporting device for a technical equipment that has to be routed along the piping. In particular, the technical equipment ideally follows the piping in order to detect any leaks from the piping.

The invention has been described more particularly in the context of the use of such protection elements in the field of aeronautics, for piping particularly carrying air at a high temperature and/or under high pressure. However, the invention applies to all areas involving protection elements or shells for piping.

In aircraft, dozens of meters of piping are arranged to collect air at high temperatures (260 to 540° C.) or under pressure (5 to 15 bar) from certain areas, such as at the engines, and to distribute that air to treatment systems that particularly make it possible to supply conditioned and/or pressurized air to specific spaces such as the cabin, in the passenger area, or provide hot air to the wings of the aircraft in order to defrost their leading edges.

The piping passes through unpressurized areas of the aircraft that are subjected to transport conditions, and is therefore exposed to the temperature and pressure conditions of the surrounding environment, particularly with temperatures of down to −50° C. and pressures as low as 0.2 bar. That is why it is necessary to insulate the piping thermally in order to carry the pressurized air at high temperatures without excessive thermal losses.

Further, it is mandatory, according to standards related to piping, that the thermal insulation is such that the surface temperature of the piping does not exceed 204° C., in order to avoid the risk of auto-ignition of fluids that may inopportunely come into contact with the outside of the pipes, as these pipes are going through areas carrying fluids such as aircraft fuel.

The piping is made of metal and is thermally insulated in a known manner by wrapping a thermally insulating material such as foam or mineral wool, and rigid protection elements placed above the insulating material. The protection elements, or at least their external skin, are generally made of metal or composite materials or of silicone or even of titanium.

The protection elements are formed of two half shells taking the pipe surrounded by the insulating material as a sandwich. The half shells are secured to the pipe by welding at their free ends, which have metal connecting sections with a Z-shaped cross-section one side of which is connected to the external skin of a half shell by gluing or welding, while the other side is designed to be welded to the pipe.

When the half shells are bounded together by gluing, this operation requires to use a curable adhesive, so as to get a strong and sealed seam, able to withstand mechanical and thermal loads. Therefore the protected piping shall be cured through an oven or an autoclave after being wrapped by the protective shell.

The piping is formed of sections joined end to end and welded to each other, and some of these are connected to closing and opening and/or regulation systems such as valves or angular compensators. The risk of leaking pipes and their connections are, for example related to a crack in the pipe, poor seal between sections, or loss of seal at the valve systems.

Leak detection is however a necessity, because these pipes run, as has been said earlier, in zones containing fluids that can self-ignite in contact with air at a high temperature.

Also, leaks can lead to a loss of function by the end system to be supplied (defrosting, air conditioning etc.)

In order to detect any leaks from the piping, the half shells of thermal insulation have orifices or aeration holes from which hot air can escape in the event of a leak, while a detection device such as sensing line is placed along the piping, with sensors opposite the aeration holes that are capable of detecting any hot air that may escape.

A sensing line is installed with supports similar to rings that are added around the thermal insulation of the pipes, which hold a cable at a certain distance from the pipe, carrying regularly spaced sensors that are located opposite the aeration holes.

These detection devices can only be put in place after the piping has been installed. Because of the intertwining of pipes in a small space, the work of putting in place and fastening a number of rings is not practical and remains fastidious, the more so since it is subsequently necessary to correctly position the cable with the sensors and the sensors opposite the aeration holes. Besides, an incorrectly fastened ring can lead to cable movement and thus a shift in the position of one or more sensors, which destroys the chance of efficient or even effective detection.

SUMMARY OF THE INVENTION

The invention is aimed at providing a protecting element for the thermal insulation of a piping, so as to form a shell of thermal insulation. This protective element providing an additional support function for a technical equipment and leading to a quick and easy installation of this equipment while ensuring its suitable positioning, said installation remaining reliable over time.

Another object of the invention is to provide a protective element that is lighter than those protective elements known from the prior art, more particularly suited for aeronautics applications.

A further object of the invention is to provide a protective element that can be secured safely and reliably to an insulated piping without use of welding or of a curing operation in an oven or in autoclave.

Accordingly, the invention concerns a protective element for protecting the thermal insulation of a pipe, said protective element comprising two half shells assembled to wrap the insulated pipe, including a half shell comprising a rigid platform protruding from the external surface of this half shell, the platform being suitable for positioning and fixing a technical equipment, wherein the shells are made of a fiber reinforced composite material, the rigid platform comprising a metallic insert integrated in the composite material.

That platform is thus integrated into the thickness of the wall. It does not constitute an independent element, but forms an integral part of the body by being a constitutive and inseparable member of the body. It forms a substantially flat surface. It constitutes means for positioning and/or supporting a device external to the protection element and distinct from the other protection element that may be added in a manner opposed to the element and opposite the cavity in a way as to form a full shell.

The platform thus provides a support for subsequent fastening. The platform is also used to make the half shell more rigid, thus avoiding deformation of the half shell over time.

The platform is raised above the remainder of the body and therefore above the pipe, placing the technical equipment to be associated at a certain separating distance from the pipe. In particular, for application in aeronautics with sensing lines, the lines are automatically set at the required distance from the shell and are set with certain regularity. This protrusion with regard to the external surface of the half shell facing the external environment is provided on the general side of the wall in order to make it more easily accessible as a means for positioning and attachment.

The protective element according to the invention is light, being made of a fiber reinforced composite material. Nevertheless, the metallic insert allows an equipment to be fastened on these shells by means of screwing or riveting, these kinds of fixture being not compatible with such a composite material.

Therefore, in an advantageous embodiment, the platform comprises at least one hole through the metallic insert, constituting a fastening means.

According to a particular preferred embodiment, said hole is tapped.

Advantageously, the protective element includes a shell wherein the wall of the shell comprises an escape hole close to the platform.

Advantageously, said escape hole is covered with a removable pad.

The removable pad makes it possible to use protection elements with or without a hole. If one or more escape holes are useful, particularly in the application of the invention in aeronautics for detecting any leak of fluid from the pipe, it is sufficient to pierce or detach the protective pad before adding the protection element against the pipe.

According to an advantageous embodiment of the protective element of the invention one of the half shells comprises a rabbet on one of its edges, the corresponding edge of the second half shell being adjusted to be guided by the rabbet and abut against the bottom of said rabbet, the joined assembly being covered by a strip of adhesive. This embodiment allows a precise assembly of the two half shells. The combination of this assembly with the adhesive produces a seal seam between the half shells.

Advantageously, the strip of adhesive is made of a fluorocarbonated elastomer coated with a permanent siliconated adhesive. Such an adhesive can withstand thermal and mechanical loads, when combined with the rabbet assembly, therefore avoiding the curing of the protected pipe in an oven or an autoclave.

The invention also relates to a thermally insulated piping comprising a plurality of protective elements according to any of the preceding embodiments, assembled end to end, wherein a sensing line, running alongside the piping, is secured to the platforms of the protective elements. Thus, the protective elements of the invention are used for fastening technical elements designed to follow the path of the piping wrapped with said elements.

According to a particular embodiment of this piping, using protective elements assembled through a rabbet, the adhesive strip extends alongside the joined assembly of the plurality of protective elements, therefore providing sealing alongside the assembly.

BRIEF DESCRIPTION OF THE DRAWINGS

This invention is now described with examples that are merely illustrative and do not in any way limit the scope of the invention, and by reference to the attached drawings, wherein.

DETAILED DESCRIPTION OF THE PREFERRED EMBODIMENTS

Figure 1:
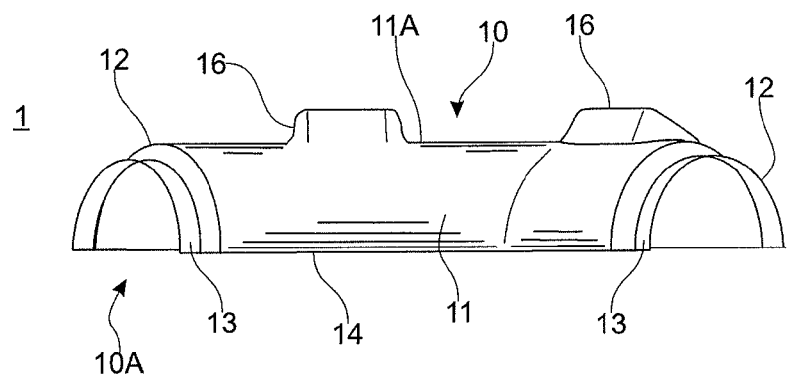
FIG. 1 represents a perspective view of a protection element according to the invention.

FIG. 1 illustrates a protection element 1 according to the invention for the thermal insulation of pipes.

This protection element, with an open concavity 10A, forms a half shell. It is made of a composite material comprising a plastic binder such as an epoxy resin reinforced by fibers with thermal insulation properties such as glass fibers.

Such a half shell is designed to cover pipes by being assembled opposite a half shell with similar mechanical and insulating properties and generally an equivalent shape, to form a protective shell.

Figure 2:
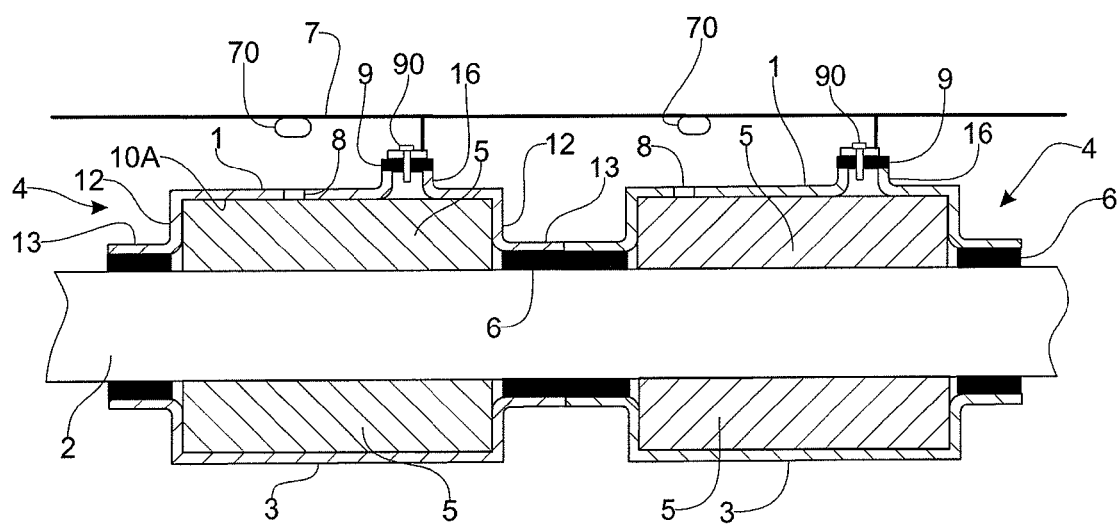
FIG. 2 is a view of a longitudinal section of a pipe associated with protection elements according to the invention and complementary elements to form protective shells for the pipe.

FIG. 2 represents a sectional view of a pipe 2 sandwiched between one half shell 1 of the invention and the complementary half shell 3, together making up a protective shell 4 around the pipe. Such a shell is for instance used for the thermal protection of the pipes used in aircraft, which convey air at a high temperature (up to 540° C.). The pipes are wrapped in thermal insulation 5 such as foam or insulating wool and covered by the protection shell 4 that forms an external skin, the temperature of which does not exceed 204° C. in accordance with the standards applicable in the area of aeronautics.

The protection element or half shell 1 may be straight or bent to adapt to the shape of the pipe to cover.

Figure 3:
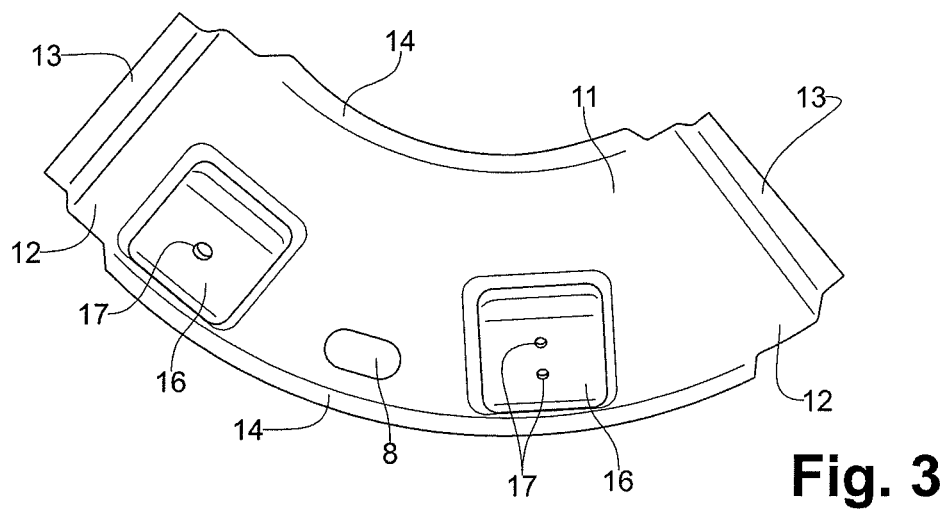
FIG. 3 represents a perspective and top view of the protection element of FIG. 1.

As illustrated in FIGS. 1 and 3, the protection element 1 has a body 10 comprising a wall 11 with a shape that is substantially concave or semi-cylindrical to cooperate with the substantially cylindrical shape of the pipes, and free ends 12.

Advantageously, the wall 11 has a shoulder 13 at each end 12 of the body that is designed for making the protection element integral with the pipe.

The wall 11 has free lateral edges 14 designed to constitute support edges for the opposite edges of the complementary half shell 3 to assemble.

Optionally, and in relation with the purpose of the half shell, the half shell has holes 8 to allow, as will be described later, the fluid flowing in the pipes to escape if the pipes have a leak.

As can be seen in FIG. 2, the protection element 1 is assembled on the pipe by placing the concavity 10A of the body against the insulation 5, and by setting the ends 12 against the pipe 2. Fastening is carried out by gluing means 6 adapted to the connection of the metal material of the pipe to the composite materials of the ends 12, more particularly of the shoulder 13.

Note that the fastening of the ends 12 of the protection element is carried out advantageously directly at the body 10 by the adapted conformation of the shoulders 13.

The complementary half shell 3 is added and fastened to the pipe in the same way as the protection element 1.

As can be seen in FIG. 2, the pipe 2 comprises several shells 4, joined end to end with each other, so as to follow the lines or curves of the pipe. Each protection element 1 of a protection shell is associated with the same side of the pipe.

According to the invention, the protection element 1 acts as the means for supporting and positioning technical equipment 7 to be associated with the pipe (FIG. 2).

The technical equipment 7 may for example be a sensing line for detecting leaks of air or other gases from the pipe. The line may itself be a sensor or be replaced by a series of sensors 70 distributed discretely, and must imperatively follow the pipe, at a specific distance from the pipe and in such a way that the sensors are placed in the immediate vicinity of at least one escape hole 8 provided in the protection element. In the event of a leak, the air escapes from the holes 8 and is detected by the sensors.

According to the invention, the protection element has a configuration that makes it directly support the sensing line. The wall 11 of the protection element 1 comprises at least one projecting shape or rigid platform 16 that constitutes a means for positioning and/or supporting the technical equipment 7 to be associated with the said element.

The platform constitutes a boss in relation to the external side 11A of the wall, which is the side opposite the open concavity 10A. It is formed by molding when the body of the element is manufactured.

Figure 4:
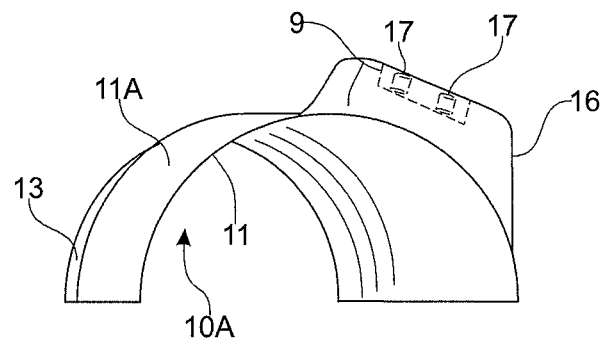
FIG. 4 represents a perspective and sectional view of a platform of the protection element according to the invention.

The platform 16 is sufficiently rigid and integrates in the wall of the body, as can be seen in FIGS. 2 and 4, at least one metal insert 9, to provide a support and fastening zone. The insert is made integral by insertion in the composite material of the body 10 during the manufacturing by molding of the protection element.

The platform 16 advantageously has at least one hole 17 that can be seen in FIGS. 3 and 4, which is designed to cooperate with a fastening piece 90 (FIG. 2) such as a screw or a rivet for fastening the technical element 7. Depending on the type of fastening used for the equipment to associate, the hole may be smooth or threaded.

The sensing line is thereby fastened for example in the manner shown in FIG. 2, the sensing line being a cable associated at a distance from the remainder of the body 10 of the protection element, and thus at a distance from the pipe. The line may be replaced by a series of sensors 70 distributed discretely. The sensors are then positioned appropriately, directly opposite the escape holes 8.

The protection element in the invention is therefore used to provide, in addition to its thermal insulation function, the function of supporting for positioning and/or fastening equipment, thanks to the presence of a rigid platform forming a surface that is appropriate for fastening.

Figure 5:
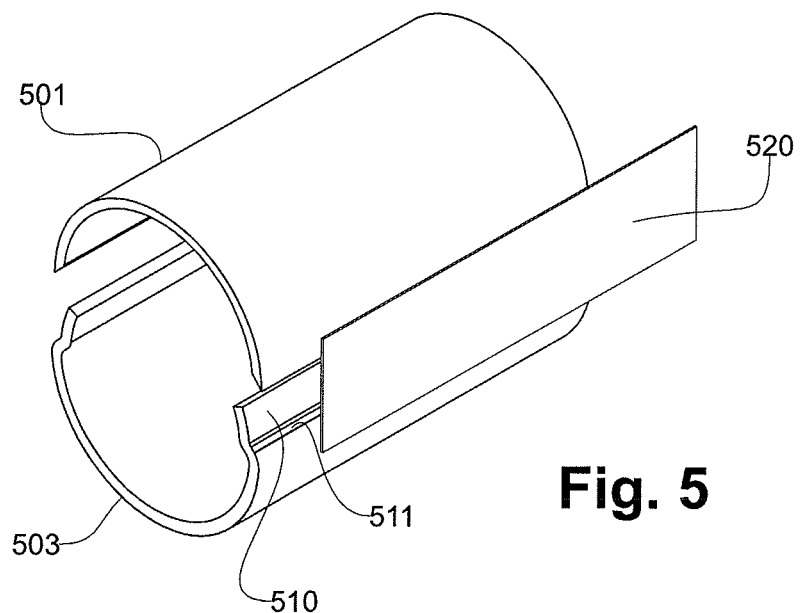
FIG. 5 shows schematically by an exploded view a section of the assembly of two shells made of a composite material, assembled through a rabbet sealed with an adhesive strip.

FIG. 5 shows a section of a protective element according to a preferred embodiment of the invention. Although said section is here represented as straight and without a platform, it shall be understood that such a protective element advantageously comprises any and all of the features described above. The two half shells 501, 502 are made by laying up pre-impregnated fiber plies in a mold, and curing such lay up in this mold. Alternatively these half shells are made by laying up dry fibers in the mold and further injecting liquid resin in the layup.

One of these half shells, here the lower shell 503, comprises a rabbet 510. The opposite half shell 501, here the upper shell, is fitted over this rabbet 510 and brought to abutment with the bottom face 511 of said rabbet. Therefore both half shells are precisely positioned relative to each other.

An adhesive strip 520, preferably made of a fluorocarbonated polymer coated with a siliconated adhesive is stuck over the seam between the two shells. When a plurality of such protective elements is assembled end to end, so as to cover a whole piping, the adhesive is stuck over the seams so as to insure proper sealing of the assembly. The adhesive strip is compliant enough so as to perfectly cover the seam. The use of a high temperature resistant pressure sensitive permanent adhesive avoids a subsequent curing operation and greatly simplifies the implementation of such a protective element.

The invention claimed is:

1. A protective element for protecting the thermal insulation of a pipe, said protective element comprising
    two half shells assembled to wrap the insulated pipe, including a half shell comprising a rigid platform protruding from an external surface of said half shell, the platform being suitable for positioning and fixing a technical equipment, wherein the shells are made of a composite material comprising a plastic binder reinforced with thermal insulating fibers, and the rigid platform comprising a metallic insert integrated in the composite material and being inseparable from the body of the shell.

2. The protective element according to claim 1, wherein the platform comprises at least one hole through the metallic insert, constituting a fastening means.

3. The protective element of claim 2 wherein the hole is tapped.

4. The protective element of claim 1, including a shell wherein a wall of the shell comprises an escape hole close to the platform.

5. The protective element according to claim 4, wherein the escape hole is covered with a removable pad.

6. The protective element according to claim 1, wherein one of the half shells comprises a rabbet on one of its edges, a corresponding edge of the second half shell is adjusted to be guided by the rabbet and abut against a bottom of said rabbet to form a join assembly, the join assembly is covered by a strip of adhesive.

7. The protective element of claim 6, wherein the strip of adhesive is made of a fluorocarbonated elastomer coated with a permanent siliconated adhesive.

8. A thermally insulated piping comprising a plurality of protective elements according to claim 1, assembled end to end, wherein a sensing line, running alongside the piping, is secured to the platforms of the protective elements.

9. The thermally insulated piping of claim 8, wherein the plurality of protective elements have one of the half shells with a rabbet on one of its edges, a corresponding edge of the second half shell is adjusted to be guided by the rabbet and abut against a bottom of said rabbet to form a joined assembly, the joined assembly is covered by a strip of adhesive, wherein the adhesive strips extend alongside the joined assembly of the plurality of protective elements.

* * * * *